United States Patent [19]

Motoki

[11] Patent Number: 4,483,713

[45] Date of Patent: Nov. 20, 1984

[54] COMPOSITIONS FOR PREPARING INORGANIC FOAMED BODIES

[75] Inventor: Hideo Motoki, Ibaraki, Japan

[73] Assignee: Shikoku Kaken Kogyo Kabushiki Kaisha, Osaka, Japan

[21] Appl. No.: 394,919

[22] PCT Filed: Oct. 28, 1981

[86] PCT No.: PCT/JP81/00301

§ 371 Date: Jun. 21, 1982

§ 102(e) Date: Jun. 21, 1982

[87] PCT Pub. No.: WO82/01544

PCT Pub. Date: May 13, 1982

[30] Foreign Application Priority Data

Oct. 30, 1980 [JP] Japan ................................ 55-153642
Nov. 7, 1980 [JP] Japan ................................ 55-157254

[51] Int. Cl.$^3$ ............................................. C04B 19/04
[52] U.S. Cl. ........................................................ 106/75
[58] Field of Search ........................................... 106/75

[56] References Cited

U.S. PATENT DOCUMENTS

| | | | |
|---|---|---|---|
| 4,084,980 | 4/1978 | Motoki .................... | 106/75 |
| 4,171,985 | 10/1979 | Motoki et al. ............ | 106/75 |

FOREIGN PATENT DOCUMENTS

| | | | |
|---|---|---|---|
| 5281326 | 12/1975 | Japan .................... | 106/75 |
| 5365320 | 11/1976 | Japan .................... | 106/75 |
| 5585450 | 12/1978 | Japan .................... | 106/75 |
| 59271 | 5/1980 | Japan .................... | 106/75 |
| 104960 | 8/1980 | Japan .................... | 106/75 |

*Primary Examiner*—James Poer
*Attorney, Agent, or Firm*—Armstrong, Nikaido, Marmelstein & Kubovcik

[57] ABSTRACT

A composition for preparing inorganic foamed bodies which comprises a water-soluble silicate of alkali metal and/or ammonium, a metallic blowing agent, a hardening agent for the silicate, and a foaming stabilizer as active components. Foamed bodies having outstanding properties can be prepared from the composition without application of heat or pressure.

16 Claims, 1 Drawing Figure

COMPOSITIONS FOR PREPARING INORGANIC FOAMED BODIES

TECHNICAL FIELD

This invention relates to compositions for preparing inorganic foamed bodies, and more particularly to compositions which afford foamed bodies merely when kneaded with water at ambient temperature.

Conventionally inorganic foamed bodies are prepared by the following processes:
 (a) Process wherein air is blown into a composition consisting chiefly of cement to obtain a foamed mortar.
 (b) Process wherein a metallic blowing agent is admixed with water glass to foam the glass.
 (c) Process wherein a surfactant is admixed with water glass to foam the glass.
 (d) Process wherein a fluoride or silicofluoride is further admixed with the composition of process (c).
 (e) Process wherein a natural high-molecular-weight material, such as casein or starch, is used conjointly with the composition of process (c) or (d).

The following difficulties are encountered in preparing foamed bodies by these conventional processes.
 (1) It is difficult to adjust the time required for foaming and hardening the starting composition . . . (b) to (e)
 (2) The composition is not applicable before foaming and must therefore be applied in a foamed state . . . (a), (c) to (e)
 (3) The composition, when prepared, requires a long period time for hardening . . . (a), (c) to (e)
 (4) The foamed composition undergoes marked shrinkage during drying and is therefore liable to develop cracks . . . (a) to (e)
 (5) The composition, when applied, is very likely to fall off the place . . . (a) to (e)

The foamed bodies obtained by the conventional processes also have the following drawbacks.
 (1) Poor resistance to water . . . (a), (c) to (e).
 (2) Uneven pores in the foamed body result in low mechanical strength, especially low bending strength . . . (a) to (e).
 (3) Insufficient heat-insulating properties . . . (a) to (e).
 (4) Insufficient strength to adhere to the work or article to which the composition is applied . . . (a) to (e).
 (5) Very low ability to prevent condensation . . . (a) to (e).

We conducted research to overcome the foregoing difficulties and drawbacks of conventional inorganic foamed bodies, succeeded in developing a novel composition for preparing foamed bodies which is almost free of these drawbacks and accomplished an invention (Published Unexamined Japanese Patent Application No. 85450/1980).

The invention is characterized by mixing together the following ingredients in the presence of water to obtain a paste;
 (a) water-soluble alkali metal silicate,
 (b) cement,
 (c) foaming stabilizer,
 (d) metallic blowing agent, and
 (e) silica dust.

The composition gives at ambient temperature and atmospheric pressure foamed bodies which are outstanding in various properties. However, our subsequent research has revealed that the foamed body still remains to be improved in its adhesion after immersion in water and also in its compression strength after it has been subjected to repeated cycles of high temperatures and low temperatures.

The present invention has been accomplished to overcome the above drawbacks.

DISCLOSURE OF THE INVENTION

Figure 1:
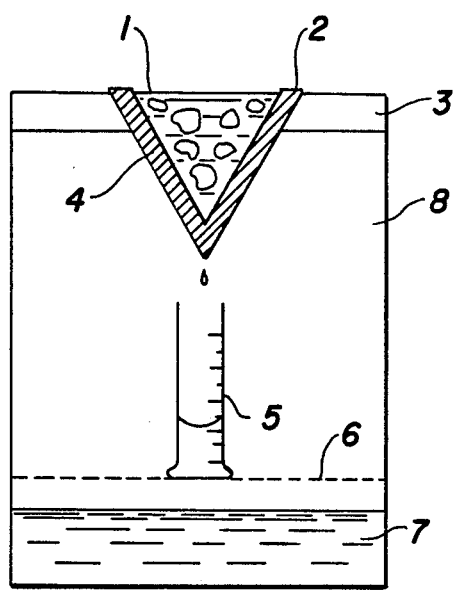
FIG. 1 illustrates an apparatus used to test the present composition for the ability to prevent condensation.

The present invention provides a composition for preparing foamed bodies which comprises as its active components:
 (A) a water-soluble alkali metal silicate,
 (B) a metallic blowing agent,
 (C) a hardening agent for the alkali metal silicate,
 (D) a foamed stabilizer, and
 (E) water.

According to the present invention, the above ingredients give an inorganic foamed body merely when mixed together at ambient temperature, provided that a water-soluble alkali metal silicate is used as A component. If A component used is a usual alkal metal silicate, such as anhydrous water glass cullet, which is insoluble or sparingly soluble in water, it is impossible to fulfill the above object. Examples of useful alkali constituents of A components are alkali metals, such as lithium, sodium, potassium and rubidium, and quaternary ammonium. Sodium and pottasium are especially preferable since they are readily available inexpensively and yet highly effective in promoting foaming and hardening. Further insofar as A component is soluble in water, the composition thereof or the mole ratio of the alkali oxide to $SiO_2$ is not limited. However, it is preferable that the mole ratio be 1.5 to 4.0, more preferably about 1.8 to about 3.0. When the mole ratio is 1.8 to 3.0, the composition gives foamed bodies having outstanding water resistance and high mechanical strength. Since A components are usable singly, or at least two of them can be used conjointly, in the form of a powder or an aqueous solution. For the ease of preparation of pastes, an aqueous solution is preferable which has a solids concentration of at least 10 wt.%, usually about 10 to 60 wt.%. In this case, merely when the aqueous solution is admixed with the other components, a pasty composition can be prepared with ease which undergoes only reduced shrinkage during hardening.

Various metal elements, metal alloys and intermetallic compounds are usable as metallic blowing agents, i.e. as B components, according to the invention. Examples of useful metal elements are those in Groups IIB, IIIA, IIIB, IVA, IVB, VA, VB, VIB, VIIB and VIII of the Periodic Table, among which those belonging to the third to fifth periods are preferable. More specific examples of preferred elements are Cr, Mn, Ti, Zr, V, Si, Ge, Sb, Fe, Co, Ni, Cu, Zn, Al, Ca, Sn, etc., among which Ti, Zr, V, Al, Si, Ge, Sb and Zn are especially preferred. In this invention, metalloid elements, such as B and As are similarly usable. Typical examples of useful alloys or intermetallic compounds (metal-to-metal compounds of metal-to-nonmetal compounds) are Al-Si, Al-Ti, Al-Mn, Al-Cu-Si, Al-Cu, Zn-S, Zn-Sn, Cu-Si, Fe-Si, Si-Ni, Co-Sb, etc. The B components are used singly, or at least two of them are used in admixture. They are used in the form of fine particles, preferably up to 150μ in size.

The hardening agent for the water-soluble alkali silicate, i.e. C component of the present composition, is at least one material selected from the group consisting of hydraulic cements, silicon dust, acidic metallic oxides, metal salts of higher fatty acids other than monovalent metal salts, metal salts, other than monovalent metal salts, of water-soluble high-melecular-weight substances having carboxyl, phosphates, borates, sulfates of divalent metals and sulfites of divalent metals. More specifically useful hardening agents include the following materials and compounds. Examples of useful hydraulic cements are hydraulic lime, natural cement, portland cement, alumina cement, and lime-containing cement, blast furnance cement, silica cement, fly ash cement, masonry cement, sulfated cement and like mixed cements. Typical of useful metal salts, other than monovalent metal salts, of higher fatty acids are zinc salts, aluminum salts, calcium salts, barium salts, magnesium salts and nickel salts of stearic acid and palmitic acid. The metal salts, other than monovalent metal salts, of water-soluble high-molecular-weight substances containing carboxyl are salts comprising a metal, other than monovalent metals, and such a water-soluble substance. Examples of at least divalent metals are Zn, Cu, Ca, Mg, Be, Sr, Ba, Al, Ti, Zr, Sb, Cr, Mo, W, Sb, Mn, Fe, Co, Ni and V. Examples of water-soluble high-molecular-weight substances are alginic acid, polyacrylic acid, polymethacrylic acid, cellulose derivatives, alkyd resin, aminoalkyd resin, etc. Silica dust is obtained as a by-product from electro-metallurgical processes for preparing silicon and silicon alloys. Preferably the silica dust is about 0.1 to about 1.0μ in particle size, about 5 to about 50 m$^2$/g in specific surface area and about 0.1 to about 0.3 in specific gravity and contains at least 60% by weight, preferably at least 80% by weight of SiO$_2$. Examples of useful acidic metallic oxides are ZnO, Cr$_2$O$_3$, MnO, Mn$_3$O$_4$, FeO, CoO, PbO, etc. Examples of useful phosphates are aluminum phosphate, calcium phosphate, zinc phosphate, thallium phosphate, strontium phosphate, barium phosphate, magnesium phosphate, manganese phosphate, etc. Examples of useful borates are zinc borate, magnesium borate, manganese borate, lead borate, nickel borate, calcium borate, etc. Examples of useful sulfates of divalent metals are magnesium sulfate, zinc sulfate, calcium sulfate and barium sulfate. Examples of useful sulfites are calcium sulfite, magnesium sulfite, zinc sulfite and copper sulfite.

Foaming stabilizers useful as D components of this invention are inorganic materials, such as silica gel, zeolite, carbon black, active carbon, talc, mica, paligorskite and sepiolite; sufactants (other than metallic soaps); and organic materials, such as animal proteins and dimethylsilicon derivatives, which are known as air-entraining agents for cements. Examples of useful surfactants are various and include anionic surfactants such as sodium polyoxyethylene alkylsulfonate and sodium alkylnaphthalene sulfonate, cationic surfactants such as lauryltrimethyl ammonium chloride and like quaternay ammonium salts, nonionic surfactants such as polyoxyethylene glycol oleate and polyoxyethylene glycol laurate, and ampholytic surfactants such as sodium n-alkyl-β-aminopropionate. Such D components act to disperse B component in the system uniformly and to assure stabilized foaming and are therefore effective in forming minute uniform pores. D component, when inorganic, is preferably used in the form of particles up to 200μ in size.

According to this invention, B component and C component perform an important function in foaming and hardening for the adjustment of the time taken for foaming and hardening and for giving improved mechanical strength. To enhance these effects, it is preferable to coat such components with other materials before use when the components are particulate. Examples of useful coating materials are water-soluble high-molecular-weight materials, such as polyvinyl alcohol, methyl cellulose, carboxymethyl cellulose, hydroxypropyl cellulose, starch, casein, gum arabic, gelatin, glue, protein, ammonium polyacrylate, sodium polyacrylate and sodium alginate; aqueous solutions, solvent solutions or aqueous dispersions of synthetic resins, such as vinyl acetate, ethylene, vinyl chloride, vinylidene chloride, acrylonitrile, methacrylates, acrylates, styrene, vinyl propionate, butadiene, phenol, epoxy, polyester, vinylpyrrolidone, vinyl ether, urea, alkyd, urethane and chloroprene; organic oily materials, such as linseed oil, castor oil, tung oil, soybean oil, sesame oil, palm oil, coconut oil, beef tallow, mutton tallow, sardine oil and whale oil; mineral oils, such as kerosene, grease, spindle oil, turbine oil, machine oil and cylinder oil; acidic phosphates; and silica sol. At least one of these materials is used. Particles of B and C components are coated with such a material which is in the form of a liquid, preferably a highly viscous liquid and then dried.

The proportions of A to D components are usually as follows although variable according to the kinds of components used, the bulk density and strength of the desired foamed product, hardening reaction conditions, etc. The proportions are based on 100 parts by weight of the solids of A component. B component is used in an amount of about 3 to about 50 parts by weight, preferably about 5 to about 40 parts by weight. The proportion of C component is about 15 to about 350 parts by weight when it is a hydraulic cement, silica dust or zinc oxide, or about 3 to about 30 parts by weight when it is a metal salt of higher fatty acid or water-soluble high-molecular-weight material having carboxyl, acidic metallic oxide, phosphate, borate, sulfate of divalent metal or sulfite of divalent metal.

The proportion of D component is about 5 to about 250 parts by weight, calculated as solids, when it is an inorganic powder, or about 0.1 to about 18 parts by weight, calculated as solids, when it is an organic material. Generally when a large excess of A component is used, the composition will not foam stably or uniformly, giving a foamed product which tends to have low resistance to water. When B component is used in too small amount, the composition will not foam sufficiently, giving a product of large bulk density (at least about 1.0), whereas if a large excess of B component is used, the composition will foam excessively to form large pores in the resulting product and reduce the strength of the product. With a lesser amount of C component present, the composition itself tends to have reduced flowability and to fall off the place in masses and will not harden smoothly, affording a foamed body of somewhat reduced water resistance. If an excess of C component is used, it is difficult to adjust the hardening reaction and foaming reaction in balance, permitting preferential progress of the hardening reaction to result in an uneven degree of foaming. When a lesser amount of inorganic material is used as D component, the composition will foam unevenly, whereas if it is used in an excessive amount, it is difficult to adjust the consistency of the pasty composition to be used. When a large excess of organic material is used as D component, an open cellular structure will be formed in the foamed product, which therefore tends to have reduced heat-insulating properties.

According to the invention, A to D components are mixed together in the presence of water to obtain a pasty composition. The mixing method is not particularly limited. While these components may be mixed together along with a suitable amount of water, it is advantageous for the ease of handling to mix together particulate B to D components in specified proportions and admix the mixture with an aqueous solution of A component. Further since B and C components start to undergo a hardening reaction and foaming reaction upon lapse of a period of time after mixing, it is desirable to formulate these two components into the pasty composition at the same time. Any usual mixing means is usable, while the components may be mixed together by means provided at the forward end of a spray nozzle. In this case, the components can be handled by any of usual procedures.

According to this invention, it is critical to formulate A to D components into a paste-like composition in the presence of water. The composition fails to give a satisfactory foamed body if it is not in the form of a paste. The term "pasty" or "paste" refers to a soft consistent dispersion of solids which has a viscosity usually of about 5 to about 1000 poises at 25° C.

Other additives can be incorporated into the composition of this invention in accordance with the application contemplated. Such additives include a fibrous material (fifth component) which gives the foamed body about 1.5 times higher bending strength than otherwise and reduces by about one half the shrinkage of the foamed body which would otherwise occur. The fibrous material is used in an amount of up to about 30 parts by weight based on the solids of A component. With an excess of fibrous material present, the composition has a decreased flowability and will not foam smoothly. Examples of useful fibrous materials are inorganic fibers, such as glass fiber, rock wool, asbestos, carbon fiber, silica fiber, and aluminum silicate fiber, and organic fibers, such as cellulose acetate fiber, polyester fiber and acrylic fiber. Such fibrous materials are used in the form of chopped strands of monofilaments. Useful additives further include a water-soluble resin (sixth component) which serves to render the composition easier to handle for application and gives 20 to 30% higher mechanical strength. The resin is used in an amount of up to about 30 parts by weight based on the solids of A component. When an excess of resin is used, the resulting foamed body has reduced resistance to water. Examples of useful water-soluble resins are water-soluble synthetic resins such as polyethylene oxide, polyethylene glycol and polyvinyl pyrrolidone, cellulose ethers such as methyl cellulose and carboxymethyl cellulose, and water-soluble natural resins such as gelatin, gum arabic, sodium alginate, protein, starch and dextrine. These water-soluble resins are used in the form of particles or as formulated into an aqueous solution. Useful additives further include a filler (seventh component). Examples of such fillers are molten silica, cristobalite, alumina, fly ash, calcium carbonate, siliceous powder, pottery powder, magnesium oxide, dolomite, inorganic pigments and granular lightweight aggregates. These fillers serve to give a reduced bulk density and increased volume to the product and to reinforce the product. Useful granular lightweight aggregates are organic or inorganic and include foamed or crushed granules or grains of synthetic resins prepared from vinyl chloride, phenol, urea, styrene, urethane, ethylene, etc.; foamed or crushed granules or grains of synthetic rubbers; vermiculite, expanded shale perlite, silica balloon, granular foamed silica and like inorganic foamed materials; crushed foamed concrete (ALC); etc. Inorganic lubricants (eighth component) may be added to the present composition to improve their flowability and workability. The lubricants are used in an amount of up to 60 parts by weight based on 100 parts of A component. Examples of the lubricant are kaoline, bentonite, zeolite and like a clay, white carbon (silica powder), magnesium silicate, etc.

When A to D components, other desired components and water are mixed together into a pasty composition, hardening and foaming reactions occur at the same time. These reactions proceed satisfactorily at ambient temperature and atmospheric pressure without application of any external heat or pressure. Usually the forming reaction completes within a set period of time of up to 24 hours, and the hardening reaction terminates in a short period of time after the completion of the foaming reaction. While the present composition is industrially very advantageous in that there is no need to apply heat or pressure to the composition, the composition can be heated to about 90° C. when it is desired to accelerate these reactions.

In this way, an inorganic foamed body of this invention can be prepared which has uniform pores usually about 0.1 to about 5 mm in size, low specific gravity and high strength and is outstanding in absorption of water, water resistance, chemical resistance, heat-insulating properties, heat resistance, flame retardancy, etc.

When the composition of this invention is prepared with the conjoint use of hydraulic cement and silica dust only as C components, the resulting foamed body exhibits lower adhesion after immersion in water and lower compression strength after having been subjected to repeated cycles of high and low temperatures than when the composition is prepared otherwise. Accordingly it is desired not to conjointly use hydraulic cement and silica dust only for the preparation of the composition. Stated more specifically, even when hydraulic cement or silica dust is used for the composition, the foamed body obtained is outstanding in these two properties insofar as hydraulic cement and silica dust are not used in combination. This is a totally unexpected remarkable finding and is a distinct feature of this invention.

Further when surfactants are used as foaming stabilizers according to the invention, the pores formed are more uniform and smaller than otherwise. Especially cement and silica dust, when used as the hardening agent C in combination with a surfactant, enhances the above effect of the surfactant.

The foamed body of this invention, which has various characteristics, is used for a wide variety of applications.

While typical applications will be described below, the use of the product is of course not limited thereto.

The present composition is useful in place of rigid urethane foam which is conventionally used as a heat-insulating material for hot water pipes for central heating. The composition is easier to apply and forms foamed bodies having higher flame retardancy and higher heat resistance to achieve greatly improved heat-insulating effects. Further when applied to pipes and fittings, the foam body adheres thereto with greatly improved strength and consequently exhibits improved resistance to impact.

The present composition is similarly useful when used for forming heat-insulating walls. Generally walls of buildings other than concrete walls are made hollow in the interior to reduce the load on steel frames and other structural elements and to assure improved heat insulation. The pasty composition of this invention can be injected into the hollow interior of walls to form heat-insulating walls. We have conducted experiments on such walls and found a totally unexpected fact. More specifically we have found that when the pasty composition is pneumatically injected into hollow portions of walls, the composition foams uniformly even when the slit-like hollow portion has a width of about 50 mm, further exhibiting outstanding rising ability. The term "rising ability" refers to the nature of the composition that it increases its volume in a vertical direction during the foaming of the composition. When the composition is applied to a portion of definite floor surface area, it is desired that the degree of foaming be equal to the degree of rising. We have further found that the pasty composition exhibits this rising ability remarkably when applied immediately after the preparation of the composition. For example, in the case of a wall hollow portion having a thickness (slit width) of 100 mm, a width of 1 m and a height of 3 m, it is entirely impossible to expect conventional plastic foams to rise 3 m, and the resulting body is not uniform in pores and therefore produces a low heat-insulating effect. However, when the present composition is applied to such hollow portion, the composition achieves satisfactory results in respect of rising ability and uniformity of pores. Accordingly walls which are outstanding in heat insulation, impact resistance, water resistance, etc. can be formed easily for new buildings as well as for existing buildings by applying the pasty composition of the invention through small bores.

The present compoition is further more excellent in adhesion than conventional plastic foams for heat-insulating walls and therefore facilitates application of tiles, since conventional plastic foams require a large amount of adhesive, whereas use of the present composition eliminates the need for adhesive and assures efficient application. The composition is additionally more useful in flame retardancy and impact resistance.

Besides the above applications, the composition of this invention has the following uses.
(a) Wall facings for buildings. The composition is applied to the surfaces of walls of buildings to form composite walls on foaming and hardening.
(b) The composition is applied to various boards as a lining for heat insulation.
(c) The composition is applied to the rear side of floors or buildings or space portions under floors to provide heat-insulating floors.
(d) The composition is useful for backups for furnances for heat insulation.
(e) The composition is applied to steel frames to form a fire proofing protection coating.
(f) A kneaded mixture of the present composition and usual aggregates provides lightweight blocks by the usual process.
(g) The pasty composition is useful for filling in the spaces between roofing tiles to give heat-insulating properties to the roof.
(h) The composition is applied to the surface of a synthetic resin foamed body to prepare an organic-inorganic composite foamed body.
(i) The composition is applied to a layer of inorganic fibers to form a foamed layer thereon and obtain a plate or board of such fibers.
(j) The composition is applied to the inner walls of tunnels to form linings thereon.
(k) The composition is useful for forming a fundation layer beneath an asphalt surface layer for constructing pavements.
(l) The composition is useful for providing heat-insulating and sound proof walls, for example, for use in powerstations.
(m) The composition is useful for constructing fundations for L.P.G., oil tanks.

The present composition is also useful for cryogenic heat-insulating materials, for insulating heaters and hot water pipes, for making composite plates with plywood and providing partitions.

The present invention will be described below in greater detail with reference to examples, in which various properties are determined by the test methods given below.
(1) Foaming start time . . . The time (minutes) takes for the composition prepared to start foaming (observed with the unaided eye).
(2) Hardening end time . . . The time (minutes) that elapsed when the foamed body becomes hard enough not to permit sinking of a 500-g weight placed thereon.
(3) Adhesion . . . By adhesion strength test specified in JIS A 6909.
(4) Bulk density . . . According to JIS A 1161.
(5) Compression strength . . . According to JIS A 1161. Unit: kg/cm$^2$.
(6) Compression strength after immersion in water for 24 hours . . . The foamed body is immersed in water for 24 hours, then withdrawn and tested by the method of (5) above. Unit: kg/cm$^2$.
(7) Thermal conductivity . . . According to JIS R 2616. Unit: W/mK.
(8) Shrinkage . . . A dimension of the specimen is measured immediately after foaming and hardening to obtain $l_0$, and further measured again after the specimen has been dried at room temperature for 7 days to obtain $l_1$. The shrinkage is given by:

$$[(l_0-l_1)/l_0]\times 100(\%)$$

(9) Bending strength . . . According to JIS Z 2248. Unit: kg/cm$^2$.
(10) Prevention of condensation . . . The composition is applied to the outer side of a conical iron plate as seen in FIG. 1, and the plate is allowed to stand with its inside maintained at 0° C. and its outside at 45° C. and at a humidity of 98% to measure the amount of condensate with the lapse of time. FIG. 1 shows ice water 1 (0° C.), the conical iron plate 2, foamed styrol 3, test composition 4, measuring cylinder 5, metal net 6, water 7 (about 60° C.), and atmosphere 8 at 45° C. and humidity of 98%.
(11) Adhesion after immersion in water (hereinafter referred to as "immersion adhesion") . . . After having been immersed in water for 96 hours, the foamed body is tested according to JIS A 6909. Unit: kg/cm².

(12) Heat cycle compression strength ... The foamed body is subjected to the cycle of: +60° C. (8 hours)→+20° C. (4 hours)→−10° C. (8 hours)→+20° C. (4 hours) for 6 days and is thereafter tested for compression strength according to JIS A 1161.

(13) Freeze-thaw stability ... According to ASTM C-290. After 20 cycles, the appearance of the specimen is observed, and the increase in weight (% by weight) is measured.

The components used in the following examples are given below.

A component (water-soluble alkali metal silicate)

| No. | Material | $SiO_2/R_2O$* mole ratio | Concn. (wt. %) | Remarks |
|---|---|---|---|---|
| A-1 | Aq. soln. of sodium silicate | 2.5 | 25 | Product of Osaka Sodium Silicate K.K. |
| A-2 | Aq. soln. of potassium silicate | 2.0 | 30 | Product of Osaka Sodium Silicate K.K. |
| A-3 | Aq. soln. of ammonium silicate | 2.1 | 30 | Reagent |
| A-4 | Aq. soln. of sodium silicate | 3.9 | 20 | " |
| A-5 | Sodium silicate powder | 3.1 | 80 | A-1 as dried and crushed |

*R: alkali metal or ammonium

B component (metallic blowing agent)

| No. | Material | Particle size (μ) | Remarks |
|---|---|---|---|
| B-1 | Si | 1–50 | Reagent |
| B-2 | Ni | 1–100 | " |
| B-3 | Al | 1–50 | Product of Toyo Aluminum K.K. |
| B-4 | Al—Cu | 5–50 | Reagent |
| B-5 | Fe—Si | 5–50 | " |

C component (hardening agent)

| No. | Material | Composition | Particle size (μ) | Remarks |
|---|---|---|---|---|
| C-1 | Alumina cement | $Al_2O_3/CaO$ = 1.57 | 5–100 | Product of Denki Kagaku Kogyo K.K. |
| C-2 | Portland cement | $CaO/SiO_2$ = 2.55 | 5–100 | Product of Denki Kagaku Kogyo K.K. |
| C-3 | High silica dust | $SiO_2$ = 95 wt. % | 0.1–1.0 | By-product from ferro-silicon making process |
| C-4 | Medium silica dust | $SiO_2$ = 82 wt. % | 0.1–1.0 | By-product obained with silicon |
| C-5 | Zinc oxide | — | 1–50 | Reagent |
| C-6 | Calcium strearate | — | 1–100 | " |
| C-7 | Magnesium polyacrylate | — | 1–100 | " |
| C-8 | $Cr_2O_3$ | — | 5–100 | " |
| C-9 | Aluminum phosphate | Powdery | 10–50 | " |
| C-10 | Magnesium borate | " | 10–50 | " |
| C-11 | Zinc sulfate | " | 10–50 | " |
| C-12 | Magnesium sulfite | " | 5–50 | " |

D component (foaming stabilizer)

| No. | Material | Particle Size (+) | Remarks |
|---|---|---|---|
| D-1 | Active carbon | 5–50 | Product of Taihei Kagaku Kogyo K.K. |
| D-2 | Zeolite | 10–100 | Product of Tohoku district, Japan |
| D-3 | Talc | 10–150 | Product of Hyogo Pref., Japan |
| D-4 | Mica | 20–200 | Product of Tohoku District, Japan |
| D-5 | "Glufoam" | — | Product of Sun Orient Kagaku K.K. |
| D-6 | Polyoxyethylene nonyl phenyl ether | — | Product of Kao Atlas K.K. |

Fifth component

| No. | Material | Fiber (mm) | Remarks |
|---|---|---|---|
| E-1 | Glass fiber | 3 | Staple |
| E-2 | Polypropylene fiber | 10 | " |
| E-3 | Zirconia fiber | 5 | " |

Sixth component

| No. | Material | | Remarks |
|---|---|---|---|
| F-1 | Polyethylene oxide | Powder | Product of Shinnittetsu Kagaku K.K. |
| F-2 | Carboxymethyl cellulose | " | Product of Daiichi Kogyo Seiyaku K.K. |
| F-3 | Starch | " | For food |

EXAMPLE 1

A 4 kg quantity of No. A-1 aqueous solution serving as A component is placed into 18-liter polyethylene container. A 200 g quantity of No. B-1 material serving as B component, 2 kg of No. C-1 material as C component and 2 kg of No. D-1 material as D component are mixed together to obtain a powder mixture, which is added to the aqueous solution. The resulting mixture is stirred at room temperature to prepare a uniform paste. The paste is applied by a trowel to a surface of asbestos slate plate to a thickness of about 2 mm. The trowel is smoothly movable to apply the paste easily. The coating is smooth-surfaced. The coating completely foams and hardens in 30 minutes. The foamed coating is tested for properties by the foregoing methods. The results are as follows.

| 1 | Foaming start time (min) | 150 |
|---|---|---|
| 2 | Hardening end time (min) | 170 |
| 3 | Adhesion (kg f/cm²) | 1.2 |
| 4 | Bulk density (coating only) | 0.35 |

-continued

| | | |
|---|---|---|
| 5 | Compression strength (kg/cm$^2$) | 6.4 |
| 6 | Water-resistance compression strength (kg/cm$^2$) | 5.9 |
| 7 | Thermal conductivity (W/mK) | 0.05 |
| 8 | Shrinkage (%) | 1.10 |
| 9 | Bending strength (kg/cm$^2$) | 4.4 |
| 10 | Condensation prevention (min) | 140 |
| 11 | Immersion adhesion (kg f/cm$^2$) | 1.0 |
| 12 | Heat cycle compression strength (kg/cm$^2$) | 6.5 |
| 13 | Freeze-thaw stability Appearance | No change |
| | Weight increase (%) | 9.0 |

EXAMPLE 2

The procedure of Example 1 is repeated except that A component is changed from No. A-1 to one of materials No. A-2 to No. A-4. Table 1 shows the test results (Experiments No. 2 to No. 4).

EXAMPLE 3

In the same manner as in Example 1, 1.2 kg of No. A-5 material (powder) is placed into a polyethylene container, and the same powder mixture as used in Example 1 is admixed with the powder. With addition of 2.5 kg of water, the resulting mixture is made into a uniform paste. The same procedure as in Example 1 is thereafter followed to obtain a foamed body. Table 1 shows the test results (Experiment No. 5).

EXAMPLE 4

The procedure of Example 1 is repeated except that B component is changed from No. B-1 to one of No. B-2 to No. B-5 materials to obtain a lightweight body. Table 2 shows the test results (Experiments 6 to 9).

EXAMPLE 5

The procedure of Example 1 is repeated except that C component is changed from No. C-1 to one of No. C-2 to No. C-5 materials to obtain a foamed body. Table 3 shows the test results (Experiments 10 to 13).

EXAMPLE 6

The same procedure as in Example 1 is repeated except that 2 kg of No. C-1 material is changed to 0.1 kg of one of No. C-6 to No. C-12 materials to obtain a foamed body. Table 4 shows the test results (Experiments 14 to 20).

EXAMPLE 7

The same procedure as in Example 1 is repeated except that D component is changed from No. D-1 to one of No. D-2 to No. D-4 materials to obtain a foamed body. Table 5 shows the test results (Experiments 21 to 23).

EXAMPLE 8

The procedure of Example 1 is repeated except that D component is changed from 2 kg of No. D-1 material to 50 g of No. D-5 or No. D-6 material to obtain a foamed body. Table 5 shows the test results (Experiments 24 and 25).

TABLE 1

| | | Exp. 2 | Exp. 3 | Exp. 4 | Exp. 5 |
|---|---|---|---|---|---|
| 1 | Foaming start time (min) | 160 | 180 | 140 | 140 |
| 2 | Hardening end time (min) | 190 | 220 | 170 | 170 |
| 3 | Adhesion (kg f/cm$^2$) | 1.4 | 1.2 | 1.5 | 1.2 |
| 4 | Bulk density | 0.37 | 0.42 | 0.39 | 0.36 |
| 5 | Compression strength (kg/cm$^2$) | 6.6 | 6.2 | 5.4 | 6.2 |
| 6 | Water-resistance compression strength (kg/cm$^2$) | 5.9 | 5.5 | 5.2 | 5.9 |
| 7 | Thermal conductivity (W/mK) | 0.05 | 0.06 | 0.06 | 0.05 |
| 8 | Shrinkage (%) | 1.05 | 1.00 | 1.10 | 1.05 |
| 9 | Bending strength (kg/cm$^2$) | 4.7 | 4.3 | 4.9 | 4.3 |
| 10 | Condensation prevention (min) | 130 | 130 | 130 | 140 |
| 11 | Immersion adhesion (kg f/cm$^2$) | 1.3 | 1.0 | 1.2 | 1.1 |
| 12 | Heat cycle compression strength (kg/cm$^2$) | 6.5 | 6.2 | 5.7 | 6.0 |
| 13 | Freeze-thaw stability Appearance | No change | No change | No change | No change |
| | Weight increase (%) | 8.5 | 8.6 | 8.1 | 7.9 |

TABLE 2

| | | Exp. 6 | Exp. 7 | Exp. 8 | Exp. 9 |
|---|---|---|---|---|---|
| 1 | Foaming start time (min) | 210 | 55 | 90 | 70 |
| 2 | Hardening end time (min) | 250 | 80 | 120 | 95 |
| 3 | Adhesion (kg f/cm$^2$) | 1.4 | 1.1 | 1.2 | 1.4 |
| 4 | Bulk density | 0.45 | 0.35 | 0.35 | 0.32 |
| 5 | Compression strength (kg/cm$^2$) | 5.9 | 6.7 | 5.2 | 6.0 |
| 6 | Water-resistance compression strength (kg/cm$^2$) | 4.7 | 4.9 | 4.1 | 4.4 |
| 7 | Thermal conductivity (W/mK) | 0.05 | 0.04 | 0.05 | 0.04 |
| 8 | Shrinkage (%) | 1.10 | 1.15 | 1.05 | 1.10 |
| 9 | Bending strength (kg/cm$^2$) | 4.9 | 5.1 | 3.8 | 4.8 |
| 10 | Condensation prevention (min) | 140 | 150 | 120 | 140 |
| 11 | Immersion adhesion (kg f/cm$^2$) | 1.2 | 1.0 | 1.0 | 1.1 |
| 12 | Heat cycle compression strength (kg/cm$^2$) | 5.8 | 6.6 | 5.5 | 6.2 |
| 13 | Freeze-thaw stability Appearance | No change | No change | No change | No change |

TABLE 2-continued

|  | Exp. 6 | Exp. 7 | Exp. 8 | Exp. 9 |
|---|---|---|---|---|
| Weight increase (%) | 8.1 | 8.3 | 8.2 | 8.2 |

TABLE 3

|  |  | Exp.10 | Exp.11 | Exp.12 | Exp.13 |
|---|---|---|---|---|---|
| 1 | Foaming start time (min) | 90 | 180 | 150 | 100 |
| 2 | Hardening end time (min) | 110 | 220 | 180 | 120 |
| 3 | Adhesion (kg f/cm$^2$) | 0.9 | 1.3 | 1.1 | 1.0 |
| 4 | Bulk density | 0.33 | 0.35 | 0.39 | 0.38 |
| 5 | Compression strength (kg/cm$^2$) | 6.1 | 7.5 | 7.3 | 6.9 |
| 6 | Water-resistance compression strength (kg/cm$^2$) | 4.9 | 4.3 | 4.2 | 4.8 |
| 7 | Thermal conductivity (W/mK) | 0.04 | 0.04 | 0.04 | 0.05 |
| 8 | Shrinkage (%) | 1.00 | 1.00 | 1.10 | 1.05 |
| 9 | Bending strength (kg/cm$^2$) | 4.7 | 5.1 | 4.2 | 4.5 |
| 10 | Condensation prevention (min) | 150 | 120 | 130 | 130 |
| 11 | Immersion adhesion (kg f/cm$^2$) | 0.9 | 1.1 | 1.0 | 0.9 |
| 12 | Heat cycle compression strength (kg/cm$^2$) | 5.8 | 7.0 | 7.2 | 6.5 |
| 13 | Freeze-thaw stability — Appearance | No change | No change | No change | No change |
|  | Weight increase (%) | 8.0 | 16.0 | 14.3 | 8.2 |

TABLE 4

|  |  | Exp.14 | Exp.15 | Exp.16 | Exp.17 | Exp.18 | Exp.19 | Exp.20 |
|---|---|---|---|---|---|---|---|---|
| 1 | Foaming start time (min) | 50 | 120 | 130 | 110 | 120 | 110 | 90 |
| 2 | Hardening end time (min) | 70 | 150 | 160 | 130 | 150 | 150 | 120 |
| 3 | Adhesion (kg f/cm$^2$) | 1.3 | 1.1 | 0.9 | 0.9 | 1.0 | 1.0 | 1.2 |
| 4 | Bulk density | 0.40 | 0.39 | 0.40 | 0.35 | 0.36 | 0.36 | 0.38 |
| 5 | Compression strength (kg/cm$^2$) | 5.8 | 5.9 | 5.8 | 6.0 | 6.0 | 6.2 | 6.8 |
| 6 | Water-resistance compression strength (kg/cm$^2$) | 5.7 | 5.4 | 4.2 | 4.9 | 4.2 | 4.3 | 5.0 |
| 7 | Thermal conductivity (W/mK) | 0.06 | 0.06 | 0.06 | 0.05 | 0.05 | 0.05 | 0.05 |
| 8 | Shrinkage (%) | 1.00 | 0.95 | 1.00 | 1.05 | 1.05 | 1.00 | 1.05 |
| 9 | Bending strength (kg/cm$^2$) | 4.0 | 3.9 | 3.9 | 4.2 | 4.0 | 4.0 | 3.8 |
| 10 | Condensation prevention (min) | 120 | 130 | 140 | 120 | 120 | 110 | 140 |
| 11 | Immersion adhesion (kg f/cm$^2$) | 1.1 | 1.0 | 0.9 | 1.0 | 0.9 | 0.8 | 1.1 |
| 12 | Heat cycle compression strength (kg/cm$^2$) | 5.9 | 5.8 | 5.6 | 5.7 | 5.8 | 6.4 | 6.6 |
| 13 | Freeze-thaw stability — Appearance | No change | No change | No change | No change | No change | No change | No change |
|  | Weight increase (%) | 8.2 | 7.9 | 8.3 | 8.0 | 8.2 | 8.0 | 8.0 |

TABLE 5

|  |  | Exp.21 | Exp.22 | Exp.23 | Exp.24 | Exp.25 |
|---|---|---|---|---|---|---|
| 1 | Foaming start time (min) | 130 | 140 | 140 | 140 | 130 |
| 2 | Hardening end time (min) | 160 | 160 | 170 | 170 | 150 |
| 3 | Adhesion (kg f/cm$^2$) | 0.9 | 1.1 | 1.1 | 1.0 | 1.0 |
| 4 | Bulk density | 0.36 | 0.37 | 0.35 | 0.32 | 0.33 |
| 5 | Compression strength (kg/cm$^2$) | 6.2 | 6.9 | 7.1 | 6.0 | 6.3 |
| 6 | Water-resistance compression strength (kg/cm$^2$) | 3.9 | 4.8 | 4.7 | 4.5 | 4.5 |
| 7 | Thermal conductivity (W/mK) | 0.05 | 0.05 | 0.05 | 0.04 | 0.05 |
| 8 | Shrinkage (%) | 1.10 | 1.05 | 1.10 | 1.00 | 1.05 |
| 9 | Bending strength (kg/cm$^2$) | 4.1 | 4.5 | 4.3 | 4.0 | 3.9 |
| 10 | Condensation prevention (min) | 120 | 150 | 160 | 110 | 100 |
| 11 | Immersion adhesion (kg f/cm$^2$) | 0.8 | 1.0 | 1.1 | 1.1 | 0.8 |
| 12 | Heat cycle compression strength (kg/cm$^2$) | 5.9 | 6.1 | 6.2 | 5.8 | 6.3 |
| 13 | Freeze-thaw stability — Appearance | No change | No change | No change | No change | No change |
|  | Weight increase (%) | 7.9 | 7.9 | 8.3 | 8.0 | 8.3 |

EXAMPLE 9

A foamed body is prepared in the same manner as in Example 1 with the exception of adding 400 g of one of No. E-1 to No. E-3 materials, i.e. fifth components, to the powder mixture and further adding 20 g of water to the resulting mixture. Table 6 shows the test results (Experiments 26 to 28).

EXAMPLE 10

A foamed body is prepared in the same manner as in Example 1 with the exception of adding 200 g of one of No. F-1 to No. F-3 materials, i.e. sixth components, to the powder mixture and further adding 10 g of water to the resulting mixture. Table 7 shows the test results (Experiments 29 to 31).

EXAMPLE 11

Foamed bodies are prepared in the same manner as in Example 1 except that the components listed in Table 8 are used. Table 9 shows the test results (Experiment 32 to 41).

TABLE 6

|   | Exp.26 | Exp.27 | Exp.28 |
|---|---|---|---|
| 1 Foaming start time (min) | 140 | 150 | 140 |
| 2 Hardening end time (min) | 180 | 180 | 170 |
| 3 Adhesion (kg f/cm$^2$) | 1.3 | 1.2 | 1.1 |
| 4 Bulk density | 0.36 | 0.37 | 0.33 |
| 5 Compression strength (kg/cm$^2$) | 6.8 | 6.5 | 6.3 |
| 6 Water-resistance compression strength (kg/cm$^2$) | 5.7 | 4.9 | 5.1 |
| 7 Thermal conductivity (W/mK) | 0.05 | 0.05 | 0.05 |
| 8 Shrinkage (%) | 0.55 | 0.50 | 0.50 |
| 9 Bending strength (kg/cm$^2$) | 6.2 | 6.3 | 5.9 |
| 10 Condensation prevention (min) | 130 | 120 | 140 |

TABLE 7

|   | Exp.29 | Exp.30 | Exp.31 |
|---|---|---|---|
| 1 Foaming start time (min) | 150 | 140 | 150 |
| 2 Hardening end time (min) | 180 | 170 | 180 |
| 3 Adhesion (kg f/cm$^2$) | 1.2 | 1.1 | 1.2 |
| 4 Bulk density | 0.33 | 0.33 | 0.35 |
| 5 Compression strength (kg/cm$^2$) | 8.1 | 7.5 | 7.9 |
| 6 Water-resistance compression strength (kg/cm$^2$) | 5.2 | 4.5 | 4.9 |
| 7 Thermal conductivity (W/mK) | 0.05 | 0.05 | 0.05 |
| 8 Shrinkage (%) | 1.10 | 1.10 | 1.05 |
| 9 Bending strength (kg/cm$^2$) | 4.8 | 4.9 | 4.3 |
| 10 Condensation prevention (min) | 140 | 120 | 120 |

TABLE 8

|   |   | Exp.32 | Exp.33 | Exp.34 | Exp.35 | Exp.36 | Exp.37 | Exp.38 | Exp.39 | Exp.40 | Exp.41 |
|---|---|---|---|---|---|---|---|---|---|---|---|
|   | A-1 | 4 kg | 4 kg | 4 kg | 4 kg | 4 kg | 4 kg | 4 kg | 4 kg | 4 kg | 4 kg |
|   | B-1 | 35 g | 450 g | 200 g | 200 g | 200 g | 200 g | 300 g | 200 g | 300 g | 200 g |
| C | C-1 | 2 kg | 2 kg | 200 g | 3.2 kg | 100 g | — | 3 kg | 2 kg | 2 kg | 2 kg |
|   | C-6 | — | — | — | — | 30 g | 280 g | — | — | — | — |
| D | D-1 | 2 kg | — | — | 2 kg | 2 kg | 2 kg | 70 g | 2.2 kg | — | — |
|   | D-6 | — | 50 g | 50 g | — | — | — | 2 g | — | 2 g | 120 g |

TABLE 9

|   |   | Exp. 32 | Exp. 33 | Exp. 34 | Exp. 35 | Exp. 36 | Exp. 37 | Exp. 38 | Exp. 39 | Exp. 40 | Exp. 41 |
|---|---|---|---|---|---|---|---|---|---|---|---|
| 1 | Foaming start time (min) | 130 | 150 | 140 | 130 | 140 | 140 | 150 | 140 | 150 | 110 |
| 2 | Hardening end time (min) | 160 | 170 | 190 | 150 | 190 | 160 | 180 | 170 | 180 | 130 |
| 3 | Adhesion (kg f/cm$^2$) | 1.1 | 1.3 | 1.0 | 0.9 | 1.0 | 1.1 | 1.2 | 1.0 | 1.1 | 1.2 |
| 4 | Bulk density | 0.45 | 0.33 | 0.37 | 0.42 | 0.36 | 0.46 | 0.37 | 0.38 | 0.35 | 0.33 |
| 5 | Compression strength (kg/cm$^2$) | 6.5 | 5.4 | 6.2 | 6.5 | 5.8 | 7.2 | 4.2 | 7.4 | 4.8 | 5.9 |
| 6 | Water-resistance compression strength (kg/cm$^2$) | 5.1 | 5.1 | 3.9 | 5.1 | 3.7 | 4.5 | 3.1 | 5.8 | 3.2 | 4.1 |
| 7 | Thermal conductivity (W/mK) | 0.06 | 0.05 | 0.05 | 0.05 | 0.05 | 0.06 | 0.06 | 0.06 | 0.05 | 0.06 |
| 8 | Shrinkage (%) | 1.20 | 1.05 | 1.10 | 1.00 | 1.15 | 1.00 | 1.15 | 0.95 | 1.10 | 1.10 |
| 9 | Bending strength (kg/cm$^2$) | 4.5 | 3.6 | 4.0 | 4.2 | 4.0 | 4.2 | 3.1 | 4.9 | 3.0 | 4.3 |
| 10 | Condensation prevention (min) | 130 | 140 | 120 | 110 | 110 | 100 | 120 | 110 | 110 | 120 |
| 11 | Immersion adhesion (kg f/cm$^2$) | 0.8 | 1.3 | 0.7 | 0.7 | 0.8 | 0.9 | 1.0 | 0.8 | 0.8 | 0.8 |
| 12 | Heat cycle compression strength (kg/cm$^2$) | 6.3 | 5.5 | 5.1 | 6.6 | 5.9 | 7.0 | 4.5 | 7.2 | 4.5 | 5.0 |
| 13 | Freeze-thaw stability Appearance | No change | No change | No change | No change | No change | No change | No change | No change | No change | No change |
|   | Weight increase (%) | 8.7 | 8.0 | 8.0 | 8.7 | 8.2 | 8.3 | 8.0 | 8.9 | 7.9 | 8.0 |

EXAMPLE 12

A foamed body is prepared in the same manner as in Example 1 except that No. B-1 material serving as B component is immersed in a solution of acrylate resin (concentration: 10% by weight), then dried by a powder drying method and thereafter used as a coating metal. Table 10 shows the test results (Experiment 42).

COMPARISON EXAMPLES 1 TO 8

Foamed bodies are prepared in the same manner as in Example 1 with the exception of using the components listed in Table 11. Test results are given in Table 10.

TABLE 10

|   |   | Exp.42 | Comp.1 | Comp.2 | Comp.3 | Comp.4 | Comp.5 | Comp.6 | Comp.7 | Comp.8 |
|---|---|---|---|---|---|---|---|---|---|---|
| 1 | Foaming start time (min) | 210 | 150 | 110 | 110 | No foaming | 110 | 100 | 140 | No foaming |
| 2 | Hardening end time (min) | 240 | 160 | 130 | 240 | 40 | 130 | 130 | 170 | 50 |
| 3 | Adhesion (kg f/cm$^2$) | 1.3 | 0.7 | 0.2 | 0.9 | 1.2 | 6.2 | 0.2 | 0.3 | 0.7 |
| 4 | Bulk density | 0.34 | 0.95 | 0.20 | 0.39 | 1.9 | 0.32 | 0.9 | 0.3 | 1.8 |
| 5 | Compression strength (kg/cm$^2$) | 6.7 | 29.5 | 1.4 | 6.2 | 49 | 2.1 | 10.1 | 1.2 | 45 |
| 6 | Water-resistance | 5.8 | 20.6 | 0.7 | 1.5 | 24 | 1.5 | 6.2 | 0.3 | 26 |

TABLE 10-continued

|   |   | Exp.42 | Comp.1 | Comp.2 | Comp.3 | Comp.4 | Comp.5 | Comp.6 | Comp.7 | Comp.8 |
|---|---|---|---|---|---|---|---|---|---|---|
|   | compression strength (kg/cm$^2$) |   |   |   |   |   |   |   |   |   |
| 7 | Thermal conductivity (W/mK) | 0.05 | 0.15 | 0.05 | 0.06 | 0.25 | 0.06 | 0.13 | 0.09 | 0.23 |
| 8 | Shrinkage (%) | 1.05 | 0.90 | 1.4 | 1.2 | 2.1 | 1.1 | 1.9 | 1.8 | 2.1 |
| 9 | Bending strength (kg/cm$^2$) | 4.4 | 20.5 | 0.8 | 3.7 | 30 | 1.2 | 4.1 | 0.6 | 32 |
| 10 | Condensation prevention (min) | 150 | 20 | 110 | 100 | 10 | 60 | 10 | 50 | 10 |
| 11 | Immersion adhesion (kg f/cm$^2$) | 1.2 | 0.1 | Below 0.1 | Below 0.1 | 0.8 | 4.3 | 0.2 | Below 0.1 | 0.6 |
| 12 | Heat cycle compression strength (kg/cm$^2$) | 6.9 | 23.0 | 1.6 | 5.2 | 39.0 | 1.9 | 10.5 | 0.7 | 37 |
| 13 | Freeze-thaw stability   Appearance | No change | Entire blushing | No change | Entire blushing | Partial blushing | No change | No change | Entire blushing Dissolving | No change |
|   | Weight increase (%) | 7.2 | 23.2 | 25.0 | 19.4 | 13.1 | 18.4 | 9.2 |   | 17.5 |

TABLE 11

|   | Comp.1 | Comp.2 | Comp.3 | Comp.4 | Comp.5 | Comp.6 | Comp.7 | Comp.8 |
|---|---|---|---|---|---|---|---|---|
| A-1 | 4 kg | 4 kg | 4 kg | 4 kg | 4 kg | 4 kg | 4 kg | 4 kg |
| B-1 | 20 g | 700 g | 200 g | 200 g | 200 g | 200 g | 20 g | 700 g |
| C-1 | 2 kg | 2 kg | 100 g | 4 kg | 2 kg | 2 kg | 100 g | 4 kg |
| D-1 | 2 kg | 2 kg | 2 kg | 2 kg | 30 g | 3 kg | 30 g | 2 kg |

I claim:

1. A composition for preparing inorganic foamed bodies consisting essentially of as its active components:
   (A) a water-soluble silicate of alkali metal and/or ammonium,
   (B) a metallic blowing agent,
   (C) a hardening agent other than alumina cement for the water-soluble silicate, and
   (D) a foaming stabilizer.

2. A composition as defined in claim 1 which consists essentially of:
   (A) 100 parts by weight of the silicate,
   (B) 2 to 50 parts by weight of the metallic blowing agent,
   (C) the hardening agent which is at least one of
      (i) silica dust and zinc oxide, and
      (ii) metal salts, other than monovalent metal salts, of higher fatty acids, metal salts, other than monovalent metal salts, of water-soluble high-molecular-weight substances having carboxyl, acidic metallic oxides, phosphates, sulfates or sulfites of divalent metals and borates, in an amount of 15 to 350 parts by weight when the agent is the material (i), or 3 to 30 parts by weight when the agent is the compound (ii), and
   (D) the foaming stabilizer which is at least one of
      (i) zeolite, silica gel, carbon black, active carbon, talc, mica, paligorskite and sepiolite, and
      (ii) surfactants other than soaps, dimethylsilicon derivatives and animal protein blowing agents, in an amount of 5 to 250 parts by weight when the stabilizer is the material (i), or 0.1 to 18 parts by weight when the stabilizer is the material (ii).

3. A composition as defined in claim 1 which consists essentially of:
   (A) 100 parts by weight of the silicate,
   (B) 2 to 50 parts by weight of the metallic blowing agent,
   (C) the hardening agent which is at least one of
      (i) zinc oxide and cement materials other than alumina cement, and
      (ii) metal salts, other than monovalent metal salts, of higher fatty acids, metal salts, other than monovalent metal salts, of water-soluble high-molecular-weight substances having carboxyl, acidic metallic oxides, phosphates, sulfates or sulfites of divalent metals and borates,
      in an amount of 15 to 350 parts by weight when the agent is the material (i), or 3 to 30 parts by weight when the agent is the compound (ii), and
   (D) the foaming stabilizer which is at least one of
      (i) zeolite, silica gel, carbon black, active carbon, talc, mica, paligorskite and sepiolite, and
      (ii) surfactants other than soaps, dimethylsilicon derivatives and animal protein blowing agents,
      in an amount of 5 to 250 parts by weight when the stabilizer is the material (i), or 0.1 to 18 parts by weight when the stabilizer is the material (ii).

4. A composition as defined in claim 1 which consists essentially of:
   (A) 100 parts by weight of the silicate,
   (B) 2 to 50 parts by weight of the metallic blowing agent,
   (C) the hardening agent which is at least one of
      (i) silica dust and cement materials other than alumina cement and
      (ii) acidic metallic oxides, phosphates, sulfates or sulfites of divalent metals and borates,
      in an amount of 15 to 350 parts by weight when the agent is the material (i), or 3 to 30 parts by weight when the agent is the compound (ii), and
   (D) the foaming stabilizer which is at least one of
      (i) zeolite, silica gel, carbon black, active carbon, talc, mica, paligorskite an sepiolite, and
      (ii) surfactants other than soaps, dimethylsilicon derivatives and animal protein blowing agents,
      in an amount of 5 to 250 parts by weight when the stabilizer is the material (i), or 0.1 to 18 parts by weight when the stabilizer is the material (ii).

5. A composition as defined in claim 1 which consists essentially of:
   (A) 100 parts by weight of the silicate,
   (B) 2 to 50 parts by weight of the metallic blowing agent,
   (C) the hardening agent which comprises
      (i) 15 to 350 parts by weight of silica dust, zinc oxide, or cement material other than alumina cement, and
      (ii) 0 to 30 parts by weight of at least one of metal salts, other than monovalent metal salts, of higher fatty acids, metal salts, other than monovalent metal salts, of water-soluble high-molecular-weight substances having carboxyl, acidic metallic oxides, phosphates, sulfates or sulfites of divalent metals and borates, (D) 0.1 to 18 parts by weight of a surfactant other than soaps and serving as the foaming stabilizer.

6. A composition as defined in claim 1 which consists essentially of:
   (A) 100 parts by weight of the silicate,
   (B) 2 to 50 parts by weight of the metallic blowing agent,
   (C) the hardening agent which comprises
      (i) 180 to 350 parts by weight of silica dust, zinc oxide, or cement material other than alumina cement, and
      (ii) 0 to 30 parts by weight of at least one of metal salts, other than monovalent metal salts, of higher fatty acids, acidic metal oxides, other than monovalent metal salts, of water-soluble high-molecular-weight substances having carboxyl, acidic metallic salts, phosphates, sulfates or sulfites of divalent metals and borates,
   (D) the foaming stabilizer which is at least one of
      (i) zeolite, silica gel, carbon black, active carbon talc, mica, paligorskite and sepiolite,
      (ii) animal protein blowing agents and dimethylsilicon derivative, and
      (iii) surfactants other than metallic soaps, in an amount of 60 to 250 parts by weight when the stabilizer is the material (i), 5 to 18 parts by weight when the stabilizer is the material (ii) or 0 to 18 parts by weight when the stabilizer is the surfactant (iii).

7. A composition as defined in claim 1 which consists essentially of:
   (A) 100 parts by weight of the silicate,
   (B) 2 to 50 parts by weight of the metallic blowing agent,
   (C) the silicate which comprises at least one of
      (i) zinc oxide and cement material other than alumina cement, and
      (ii) metal salts, other than monovalent metal salts, of higher fatty acids, acidic metal oxides, other than monovalent metal salts, of water-soluble high-molecular-weight substances having carboxyl, acidic metallic salts, phosphates, sulfates or sulfites of divalent metals and borates,
   in an amount of 15 to 350 parts by weight of (i), 3 to 30 parts by weight of (ii),
   (D) the foaming stabilizer which is at least one of
      (i) zeolite, silica gel, carbon black, active carbon, talc, mica, paligorskite and sepiolite, and
      (ii) animal protein blowing agents, surfactants other than soaps and dimethylsilicon derivative,
   in an amount of 5 to 250 parts by weight of (i), 0.1 to 18 parts by weight of (ii).

8. A composition as defined in any one of claims 1 to 7 wherein the silicate has $SiO_2/R_2O$ mole ratio of 1.5 to 4.0, R being an alkali metal or quaternary ammonium.

9. A composition as defined in any one of claims 1 to 7 wherein the silicate is used in the form of an aqueous solution having a concentration of 10 to 60%.

10. A composition as defined in any one of claims 1 to 7 wherein the metallic blowing agent is at least one of zinc, silicon and metals, other than monovalent and divalent metals, or an alloy thereof or an intermetallic compound thereof.

11. A composition as defined in any one of claims 1 to 7 wherein the metallic blowing agent is at least one of titanium, vanadium, zirconium, aluminum, silicon, germanium, antimony and zinc.

12. A composition as defined in any one of claims 1 to 7 which further comprises a fibrous material.

13. A composition as defined in any one of claims 1 to 7 which further comprises a water-soluble resin.

14. A composition as defined in any one of claims 1 to 7 which further comprises an inorganic swollen material.

15. A composition as defined in any one of claims 1 to 7 wherein the metallic blowing agent is covered with a coating material.

16. A composition as defined in claim 10 wherein the metallic blowing agent is at least one of titanium, vanadium, zirconium, aluminum, silicon, germanium, antimony and zinc.

* * * * *